United States Patent
Gartz et al.

(10) Patent No.: US 6,200,015 B1
(45) Date of Patent: *Mar. 13, 2001

(54) MIXING CONTAINER

(75) Inventors: Mark R. Gartz, Mount Prospect; Daniel A. Phipps, Round Lake, both of IL (US)

(73) Assignee: The Pampered Chef, Ltd., Addison, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,538

(22) Filed: Feb. 26, 1999

(51) Int. Cl.[7] ........................................ A47J 43/04
(52) U.S. Cl. ............................. 366/256; 366/333
(58) Field of Search .................... 366/129, 130, 366/242–247, 255–260, 332, 333

(56) References Cited

U.S. PATENT DOCUMENTS

| | | | |
|---|---|---|---|
| 99,883 | * | 2/1870 | Haines . |
| D. 167,259 | | 7/1952 | Fox .......................................... D44/1 |
| 203,081 | * | 4/1878 | Silver . |
| D. 285,892 | | 9/1986 | Doyel ..................................... D7/376 |
| D. 321,301 | | 11/1991 | Purkapile ............................. D7/376 |
| D. 365,246 | | 12/1995 | Staffin et al. ......................... D7/376 |
| D. 384,237 | | 9/1997 | Hess ..................................... D7/319 |
| 527,022 | * | 10/1894 | Parrish . |
| 632,780 | | 9/1899 | Crepeau . |
| 978,298 | * | 12/1910 | Inwood . |
| 1,165,307 | * | 12/1915 | Baltzley . |
| 1,290,231 | * | 1/1919 | Kenley . |
| 1,948,431 | * | 2/1934 | Rolph . |
| 1,998,692 | * | 4/1935 | Van Rossem et al. . |
| 2,162,348 | * | 6/1939 | Hacmac . |
| 2,166,437 | * | 7/1939 | Howie et al. . |
| 2,266,186 | | 12/1941 | Fischer . |
| 2,291,708 | * | 8/1942 | Gluck . |
| 2,481,352 | * | 9/1949 | Sabatella . |
| 2,484,391 | | 10/1949 | Treiss, Jr. . |
| 2,546,285 | * | 3/1951 | Wittmann . |
| 2,726,071 | * | 12/1955 | Bernhardt . |
| 2,749,098 | * | 6/1956 | Johnson . |
| 2,922,628 | * | 1/1960 | Koe . |
| 3,137,228 | * | 6/1964 | Elow . |
| 4,010,934 | * | 3/1977 | McCord et al. . |
| 4,359,283 | | 11/1982 | McClellan ............................ 366/247 |
| 4,460,279 | * | 7/1984 | Krasney ............................... 366/247 |
| 4,737,036 | * | 4/1988 | Offermann ........................... 366/130 |
| 4,946,286 | | 8/1990 | Purkapile ............................. 366/247 |
| 5,407,270 | | 4/1995 | Barile et al. ......................... 366/247 |
| 5,482,367 | * | 1/1996 | Khan et al. .......................... 366/129 |
| 5,580,169 | | 12/1996 | Ghidini ................................ 366/256 |
| 5,695,282 | | 12/1997 | Hess ..................................... 366/256 |
| 5,780,087 | * | 7/1998 | Brady . |
| 5,908,241 | * | 6/1999 | Bliss et al. ........................... 366/129 |

FOREIGN PATENT DOCUMENTS

| | | | |
|---|---|---|---|
| 165229 | * | 6/1921 | (GB) .................................... 366/256 |
| 194154 | * | 3/1923 | (GB) .................................... 366/256 |
| 94/27714 | * | 12/1994 | (WO) ................................... 366/256 |

* cited by examiner

*Primary Examiner*—Charles E. Cooley
(74) *Attorney, Agent, or Firm*—Olson & Hierl, Ltd.

(57) ABSTRACT

A mixing container is provided which has a housing and a disassociatively associatable mixer subassembly. The mixer subassembly includes a top portion, a rod that slidably and reciprocatably extends centrally through the top portion, a gripping portion at one rod end, and a mixing head at the opposite rod end. The mixing head has a medial body portion and a peripheral portion. The peripheral portion has a plurality of perimetrically adjacent whorl-like portions. Each whorl-like portion includes two wing loop portions that extend outwardly and obliquely relative to the medial body portion.

9 Claims, 2 Drawing Sheets

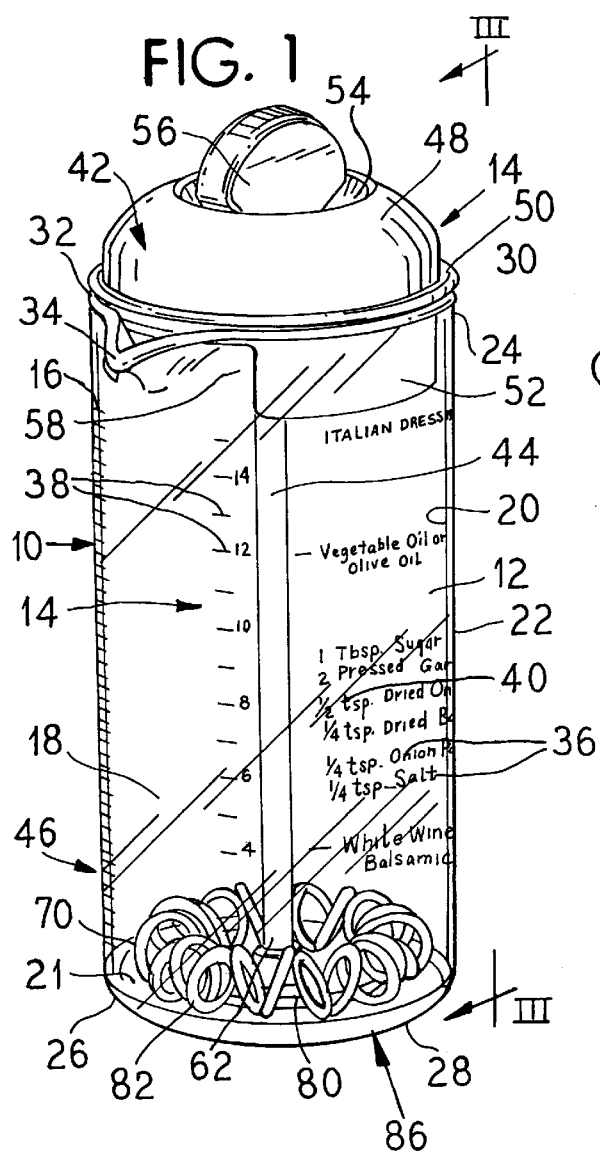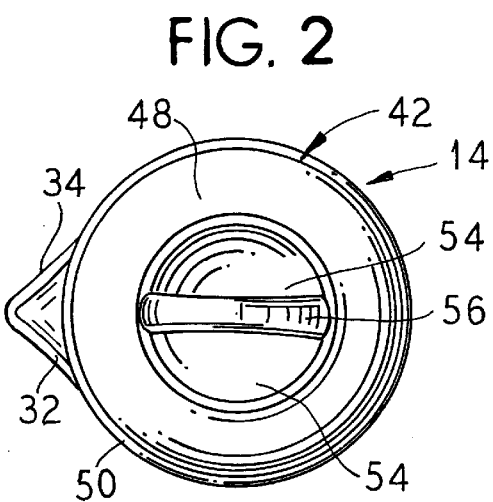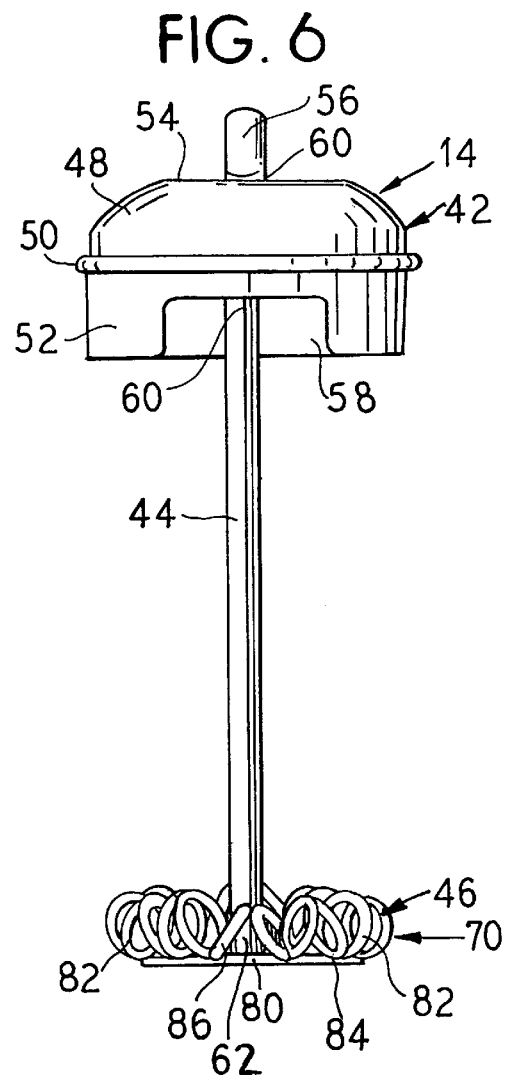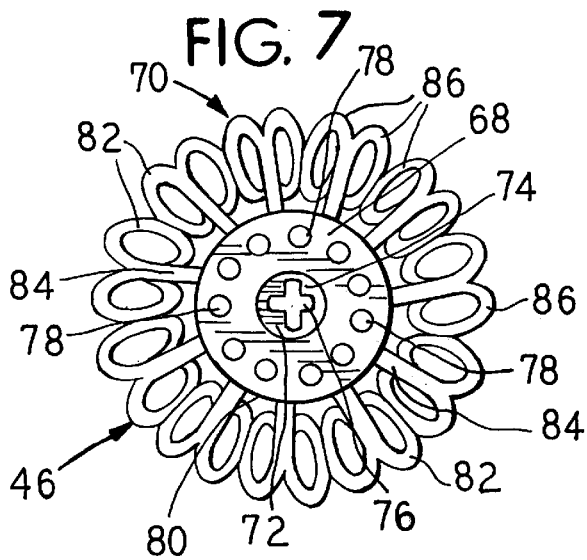

MIXING CONTAINER

TECHNICAL FIELD OF THE INVENTION

This invention relates to a container and more particularly to a container having a mixing apparatus for forming a mixture using ingredients disposed on the container.

BACKGROUND OF THE INVENTION

It is well known that in preparing mixtures, including cocktails, mixed drinks, edible condiments, including salad dressings and the like, the proper proportion of ingredients, and the mixing or blending thereof, are important. A number of prior art patents have recognized this need and proposed containers that provide for proper mixing or blending. Typical patents in this area include U.S. Pat. Nos. 2,266,186, 2,484,391 and 5,580,169.

Additionally, it is a common expedient to use a container to store the mixture, which may settle or separate during such storage, especially if the mixture includes solids. Such separated mixtures require additional blending prior to use. U.S. Pat. No. 4,359,283 discloses a representative device.

However, these prior art devices are not without their drawbacks. It is not uncommon for prior art devices to include only a mixing assembly, requiring the user to supply his own container. Those devices that do include containers generally fail to provide measuring indicia and a list of ingredients/directions, requiring the user to provide both a separate measuring device and a list of ingredients/directions.

Finally, while some prior art devices include a container which may have indicia markings, they fail to provide a mixing device that provides for proper blending and good mixture flow during mixing or blending. This is especially true for containers that are used to store a mixture.

SUMMARY OF THE INVENTION

The subject invention relates to a new and useful multi-use container that provides for proper mixing or blending of a mixture. Preferably the container has measuring indicia and ingredients/directions disposed thereon.

The container includes a housing and mixing assembly having a mixing head. The housing has an open mouth end and an opposed closed bottom end, with the mixing assembly in communication with the housing. The mixing head includes a medial body portion and a peripheral portion, and the mixing head is guidingly supported in the mixing assembly and configured for reciprocal movement.

In one preferred embodiment, the mixing assembly includes a rod configured for reciprocal and rotational movement in the housing, where the rod has a gripping portion attached to one end and the mixing head to the other.

In the mixing head, the medial body portion is connected to the rod and the peripheral portion is formed on a periphery of the medial body portion. The peripheral portion is comprised of a plurality of whorl-like portions.

Additionally, the mixing head includes at least one, but preferably more, apertures formed in the medial body portion. The cooperative relationship of the apertures and the peripheral portion provides for an increased mixture flow during mixing. This is especially important if the container and mixing assembly are used to store a mixture that has settled.

Various other objects, aims, purposes, features, advantages, embodiments, variations, and the like will be apparent to those skilled in the art from the teachings of the present specification taken with the associated drawings and appended claims.

BRIEF DESCRIPTION OF THE DRAWINGS

In the drawings,

FIG. 1 is a perspective view of a container having a mixing assembly in accordance with the present invention;

FIG. 2 is a top plan view of the container of FIG. 1 depicting the top portion of the mixing assembly therein in accordance with the present invention;

FIG. 6 is an elevational side view of the mixing assembly in accordance with the present invention; and FIG. 7 is an end view of the mixing head of the mixing assembly of FIG. 6 in accordance with the present invention.

DESCRIPTION OF THE PREFERRED EMBODIMENT

While this invention is susceptible to different embodiments, this specification and the accompanying drawings disclose only a preferred embodiment or example of the invention. The invention is not intended to be limited to the embodiment so described, however. The scope of the invention is identified in the appended claims.

Turning to FIG. 1, container 10 is shown comprised of at least two components, a housing 12 and a mixing assembly 14.

Figure 4:
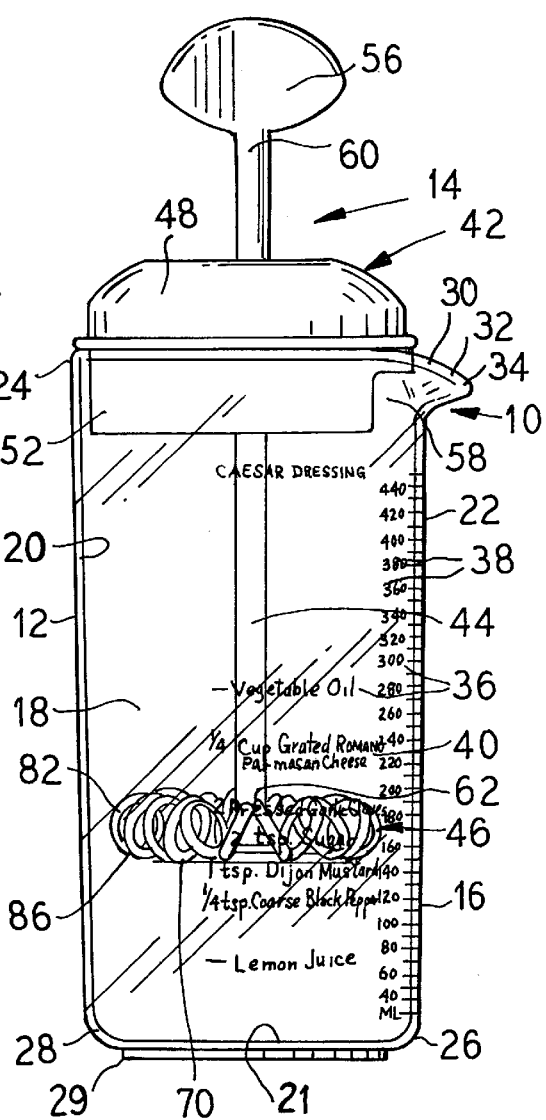
FIG. 4 is an elevational side view of the container of FIG. 1 depicting the mixing head of the mixing assembly in a raised mixing position in accordance with the present invention.

As seen in FIGS. 1 and 4, housing 12 is preferably made of a rigid plastic material suitable for injection molding, has a generally tubular (e.g. cylindrical) shape and is configured to receive material to be mixed. Further, housing 12 has a circular shape when viewed from above or below (seen in FIGS. 2 and 5). The generally tubular, circular shape and use of rigid plastic material are preferred, and other configurations and materials may be used.

Figure 3:
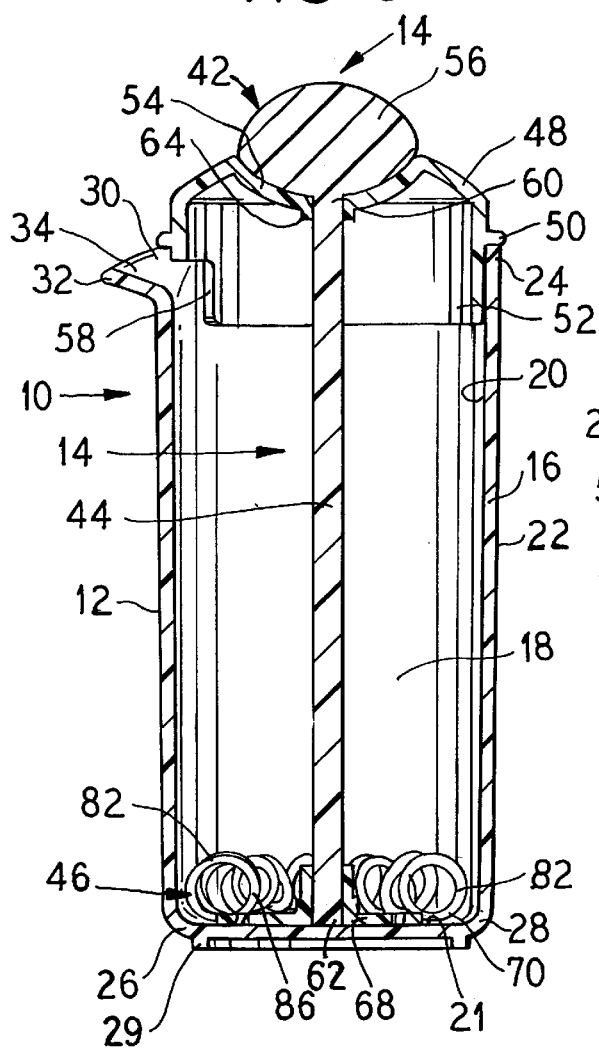
FIG. 3 is a vertical sectional view taken substantially along line III—III of FIG. 1.
Figure 5:
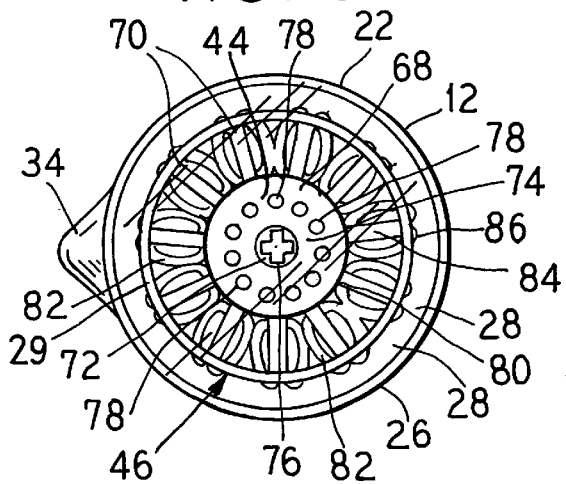
FIG. 5 is a bottom plan view of the container of FIG. 1 depicting the mixing head of the mixing assembly in accordance with the present invention.

A generally tubular side wall 16 in the housing 12 defines a chamber 18 having an inner side surface 20 and inner bottom surface 21. Housing 12 further includes an outer surface 22 with an upper edge 24 and a lower edge 26 that adjoins adjacent closed end 28. The tubular wall 16 has an open mouth end 30 defined by upper edge 24 and an opposite closed end 28. The closed end 28 is preferably, as shown in FIGS. 3, 4 and 5, provided with an integral, circularly-shaped resting ridge 29 for supporting housing 12. In the preferred embodiment shown, upper edge 24 includes a lip 32, where upper edge 24, lip 32 and tubular wall 14 define a projecting pouring spout 34.

In the preferred embodiment shown, container 10 preferably includes markings disposed thereon (seen in FIGS. 1 and 4). Markings 36 are preferably comprised of measuring indicia 38 and ingredients/directions 40 disposed on housing 12. As shown in FIGS. 1 and 4, measuring indicia 38 include opposed measuring marks, preferably including both standard English and Metric measurements. Directions 40 on the other hand, include the ingredients and directions for forming the mixture, preferably a salad dressing or other condiment. However directions for other mixtures are contemplated, including drink mixes, cocktails, medicinal mixtures, irrigation solutions, etc. While a container 10 including both measuring indicia 38 and directions 40 is preferred, an embodiment having only one such marking 36 is contemplated. Moreover, it is contemplated that markings 36 could be formed on inner side surface 20 or outer surface 22 in any suitable manner.

In the preferred embodiment shown, mixing assembly 14 is in removable and replaceable communication with housing 12 at open end 30, and is comprised of a top portion 42, an elongated rod 44 and a mixing head 46.

As viewed in FIGS. 1 and 6, top portion 42 has a cup-like appearance when viewed from the side, and round when viewed from above (seen in FIG. 2). Top portion 42 includes a cap portion 48, preferably a lip or stop portion 50 and a downturned, circumferentially extending depending skirt portion 52. In the depicted embodiment, top portion 42 is a single unit comprised of rigid plastic suitable for injection molding, but other assemblies, shapes and materials are contemplated.

Cap 48 is formed with a center depression 54, seen in FIG. 3, adapted for receiving a gripping portion 56, discussed below. Additionally, depending skirt 52 of top portion 42 is adapted to be received in open end 30 in a slidably removable, replaceable manner, where depending skirt 52 forms a tight friction fit with inner side surface 20 and outwardly and circumferentially extending lip 50 preferably generally engaging or abutting lip 32 in an airtight manner, as seen for example in FIGS. 1, 3 and 4. It is further contemplated that depending skirt 52 includes at least one aperture 58 defined therein which, when aligned and in fluid communication with projecting pouring spout 34, allows a mixture to be poured from the container 10.

From the FIGURES, mixing assembly 14 is seen to include rod 44 having opposed first and second ends 60 and 62, where rod 44 is guidingly supported by an aperture 64 defined centrally in top portion 42. In the preferred embodiment shown, aperture 64 is defined in center depression 54 of cap 48 (seen in FIG. 3). Rod 44 further includes elliptically shaped gripping portion 56 attached to and contiguous with first end 60. Gripping portion 56 preferably includes finger indents to assure a good grip.

In FIG. 2, a top view of the container 10 is depicted. Top portion 42, including cap 48, is shown in operable communication with open end 30 in a replaceable, removable manner.

Cap 48 is provided with center depression 54 adapted to receive part of gripping portion 56. Top portion 42 is adapted to be received in open end 30 in a removable, replaceable manner, where depending skirt 52 forms a tight friction fit with inner side surface 20, in addition to lip 50 engaging lip 32 in an airtight manner. Furthermore, projecting pouring spout 34, when aligned with and in fluid communication with the aperture 58, provides a means for pouring a mixture from the container 10.

It is further contemplated that cap 48 may be rotated in housing 12 so that projecting pouring spout 34 is not aligned with and not in fluid communication with the aperture 58. This arrangement, along with the airtight seal formed by lips 32, 50 and tight friction fit of the depending skirt 52 and inner side surface 20, prevents a mixture from being poured from the container 10. This arrangement is useful for storing a mixture in container 10.

A sectional view of container 10 is depicted in FIG. 3. Mixing head 46 is attached to and contiguous with second end 62 which is opposite the gripping portion 56. Mixing head 46 is configured for reciprocal and rotational movement in housing 12 and includes a medial body portion 68 and an attached peripheral portion 70 that are in operable communication with rod 44.

As shown in FIG. 3, rod 44, gripping portion 56 and mixing head 46 are preferably one integral piece made of a rigid plastic material suitable for injection molding. While one piece is preferred, alternatively two or more pieces can be joined together by gluing, bonding or the like. Moreover, while rigid plastic is preferred, other materials, and or shapes, are contemplated.

The interrelationship of medial body portion 44 and peripheral portion 70 may be better understood upon reviewing FIGS. 5 and 7. FIG. 5 depicts a bottom view of container 10 with the mixing head 46 of mixing assembly 14 disposed therein. FIG. 7 depicts only the mixing head 46 of mixing assembly 14.

Mixing head 46 is as above indicated in operable communication with rod 44. In the depicted embodiment, medial body portion 68 is formed with a depressed center section 72 on its bottom surface 74. Medial body portion 68 is joined to and integral with second end 62 of rod 44 and preferably includes brace portion 76 formed in depressed center section 72 for support.

FIGS. 5 and 7 show that medial body portion 68 has defined therein at least one, but preferably a plurality of, apertures 78. Apertures 78 provide for an increased mixture flow during mixing, in addition to ensuring proper blending. Moreover, this arrangement is especially advantageous when container 10, including mixing assembly 14, is utilized to store a mixture that has a tendency to separate. The apertures 78 allow the mixing head 46 to move more easily in a mixture that has separated.

While circular apertures 78 are shown and preferred, other aperture embodiments can be sievelike or screen-like, or configured as a multiplicity of grooves or slots in medial body portion 68.

As discussed, mixing head 46 is guidingly supported in mixing assembly 14 and configured for movement within housing 12. Mixing head 46 includes peripheral portion 70 connected to medial body portion 68 along its periphery 80. In the preferred embodiment shown, peripheral portion 70 is connected to and integral with medial body portion 68 of mixing head 46, but alternatively peripheral portion 70 is affixed to medial body portion 68 by gluing, bonding or the like.

Peripheral portion 70 is comprised of a plurality of whorl-like portions 82 as shown. Each whorl-like portion 82 is formed with a radially outwardly extending stem 84 attached to periphery 80 and with two radially extending wing loop portions 86 that are each attached to stem 84 and that are each obliquely oriented relative to medial body portion 68 (seen in FIGS. 3 and 4).

Moreover, as shown in FIGS. 1 and 6, wing loop portions 86 of each stem 84 are formed at an angle to each other, preferably at a 45 degree angle, having a V-shaped appearance when viewed from the side (seen in FIGS. 1, 4 and 6).

As shown, for example, in FIGS. 1, 4, 5, 6 and 7, each wing loop portion 86 of each whorl-like portion 82 has a location that is attached to a location on one wing loop portion 86 of the circumferentially adjacent whorl-like portion 82 of peripheral portion 70. Also, as shown in these FIGURES, in each whorl-like portion 82, one wing loop portion 86 is inclined relative to the attached stem 84 at an equal but complementary angle relative to the other (or second) wing loop portion 86. Further, as shown in these FIGURES, in the mixing head 46, the medial body portion 68 is preferably generally flattened, and, in each of the whorl-like portions 82, each of the wing loop portions 86 generally upstands and extends above the medial body portion 68. While the number of whorl-like portions 82 comprising peripheral portion 70 can vary, in the preferred embodiment shown (see, for example, FIG. 7), eleven whorl-like portions 82 are employed.

As seen, for example, in FIG. 5, the peripheral portion 70, which is configured for movement in housing 12, is spaced from inner side surface 20. This spacing, along with the plurality of apertures 78 and the plurality of whorl-like portions 82 provides for maximum mixture flow during mixing. However, it also contemplated that peripheral portion 70 is adapted for slidable guiding contact with inner side surface 20 (seen in FIG. 3).

FIG. 6 shows the relationship of cap 48, rod 44, gripping portion 56 and mixing head 46. From FIG. 6, it can be seen that rod 44 slidingly extends through and protrudes from aperture 64 of cap 48. Preferably and as shown, rod 44, gripping portion 56 and mixing head 46 are integrally connected, forming a single piece made of rigid plastic suitable for injection molding.

In use, mixing assembly 14 is detached from the container 10, by disengaging cap 48, and depending skirt 52, from open end 30. The user then determines what mixture to make, perhaps reading at least one set of directions 40 disposed on housing 12 to determine the ingredients.

The ingredients are then poured into chamber 18 through mouth end 30 of the container 10 In one preferred embodiment, the user utilizes measuring indicia 38 disposed on the container 10 to determine the proper proportions thereof. Mixing assembly 14 is then replaced in open end 30, so that mixing head 46 is now disposed in the container 10.

Finally, the ingredients are mixed using the mixing head 46. In the preferred embodiment shown, the user manually grips gripping portion 56 to manipulate the mixing head 46. The user slidably moves the rod 44 and mixing head 46 up and down in a reciprocal manner, and if desired in a rotational manner.

FIG. 4 illustrates the mixing head 46 in a mixing position, with rod 44 slidingly engaging cap 48. In this manner, the peripheral portion 70 and the medial portion 68 of mixing head 46 blends, whips and/or aerates the ingredients, forming the desired mixture.

It will be readily apparent from the foregoing detailed description of the invention and from the illustrations thereof that numerous variations and modifications may be effected without departing from the true spirit and scope of the novel concepts or principles of this invention.

We claim:

1. A mixing container comprising:
    (A) a generally cylindrical housing having a closed bottom, an upwardly opening mouth opposed to said bottom, and spout means adjacent said mouth;
    (B) a mixer subassembly that is disassociatively associatable with said housing, said mixer subassembly comprising in combination:
        (1) a top portion sealingly engagable with said mouth, said top portion comprising a cap having a central channel, and a circumferentially extending, downturned, integrally formed skirt portion which is receivable through said mouth and whose circumferential outside terminal wall portions are adapted to make sealing engagement with radially adjacent circumferential inside wall portions of said housing that are longitudinally adjacent said mouth except in the region of said spout means;
        (2) a rod slidably extending through said central channel and having opposed upper and lower ends, said rod including at its upper end a gripping portion, the interrelationship between said central channel and said rod being such that said rod is reciprocally movable longitudinally through said top portion; and
        (3) a mixing head comprising
            (a) an apertured medial body portion having a perimeter portion, said medial body portion being fixed to said lower rod end, and
            (b) a peripheral portion whose outside diameter is less than the inside diameter of said housing, and
            (c) said peripheral portion being comprised of a plurality of circumferentially adjacent whorl-like portions, each whorl-like portion having
                a stem attached to, and radially outwardly extending from, said perimeter portion, and
                two wing loops, each one being attached to said stem and radially extending obliquely therefrom relative to said medial body portion and also to each other,
            each said wing loop of each said whorl-like portion having a location that is attached to a location on one wing loop of the circumferentially adjacent whorl-like portion of said peripheral portion;
    whereby, when said top portion is so sealingly engaged with said mouth, said mixing head is reciprocably moveable longitudinally in said housing by said gripping portion.

2. The mixing container of claim 1 wherein said skirt portion has defined therein a discontinuity which is generally positionable radially adjacent to said spout means so that, when said top portion is associated with said housing over said mouth, liquid being dispensed from said container through said spout means flows through said discontinuity.

3. The mixing container of claim 1 wherein said gripping portion has a bottom configuration that is cooperatively receivable in a central depression defined in said top portion when said mixing head is adjacent said bottom.

4. The mixing container of claim 1 wherein said top portion includes an outwardly-turned, circumferentially extending lip for generally abutting said mouth.

5. The mixing container of claim 1 wherein, each said whorl-like portion of said mixing head, one of said wing loops is obliquely inclined relative to said attached stem at an equal but complementary angle relative to the other of said wing loops.

6. The mixing container of claim 1 wherein, each said whorl-like portion of said mixing head, said wing loops are inclined at an angle of about 45 degrees relative to each other.

7. The mixing container of claim 1 wherein, said mixing head, said medial body portion is generally flattened, and, in each of said whorl-like portions, each of said wing loops generally extends above said medial body portion.

8. The mixing container of claim 1 wherein, in said mixing head, the number of said whorl-like portions is about 11.

9. The mixing container of claim 1 wherein said gripping portion, said rod and said mixing head are unitary formed of a plastic.

* * * * *

UNITED STATES PATENT AND TRADEMARK OFFICE
CERTIFICATE OF CORRECTION

PATENT NO.   : 6,200,015 B1
DATED        : March 13, 2001
INVENTOR(S)  : Mark B. Gartz and Daniel A. Phipps It is certified that error appears in the above-identified patent and that said Letters Patent is hereby corrected as shown below:

Column 3,
Line 29, before "outwardly" insert -- with --.
Line 31, insert a -- , -- before and after -- for example --.
Lines 32 and 33, delete "It is further contemplated that depending" and insert -- Depending --.

Column 5,
Line 22, delete "head" and insert -- device --.

Signed and Sealed this

Sixth Day of November, 2001

Attest:

Nicholas P. Godici

NICHOLAS P. GODICI
*Attesting Officer*   *Acting Director of the United States Patent and Trademark Office*